Patented Jan. 4, 1927.

1,613,218

UNITED STATES PATENT OFFICE.

JEAN HENRY BRÉGEAT, OF PARIS, FRANCE, ASSIGNOR TO BREGEAT CORPORATION OF AMERICA, OF WILMINGTON, DELAWARE, A CORPORATION OF DELAWARE.

PROCESS FOR THE RECOVERY OF CAMPHOR AND NAPHTHALENE CONTAINED IN GASEOUS MIXTURES.

No Drawing.   Application filed December 17, 1920.   Serial No. 431,526.

The invention relates to the recovery of camphor and naphthalene or either of these substances from a gaseous mixture containing the same and the invention is dependent upon the employment for this purpose of absorbents having essentially phenolic functions—absorbents as carbolic and cresylic acids,—which may be classed as phenols.

The manufacture of celluloid and similar plastic materials causes evacuation into the air of gaseous mixtures which carry—besides solvent vapors such as ether, alcohol, acetone, amyl acetate, etc.—camphor vapors in rather important amounts, which amounts vary with the process of manufacture—but which may amount to as much as 7% of the weight of camphor put into the process.

On the other hand, it is known that the gas coming from the distillation of coal (gas-works, coke-plants) contains divers hydro-carbons and particularly naphthalene.

In my French Patent No. 502,882 dated May 25th, 1916 (with addition of June 9, 1916), French Patents No. 502,975 dated July 8th, 1916, and No. 503,728 dated May 25th, 1917 (with addition No. 22,395 of November 29, 1917) also in United States Patents Nos. 1,315,700 and 1,315,701, dated Sept. 9, 1919, there are described certain stages of a continuous operation recovery process for industrial volatile solvents based on the application, as absorbent, of bodies with phenolic functions (carbolic acid and cresylic acid, for example), and,—as apparatus—of a special grouping of apparatus individually known, but the combination of which yields, in continuous operation, the solvents absorbed,—these separately and in the form of products which may be reused in the process.

Moreover, the many industrial applications which have been made of the solvent recovery process above referred to, has led to the observation that phenolic bodies possess a great affinity for the vapors of camphor and naphthalene and, it is therefore possible to recover camphor or naphthalene or both, by the use of such absorbents. This forms the object of this patent.

The vapors of camphor and naphthalene are absorbed by the phenolic bodies according to the manner described in the patents above referred to for the absorption of volatile solvents. The absorbents used in the present process, as in the said prior cases consist essentially of phenolic bodies, which may if desired be in the commercial or technical state of purity, as distinguished from the chemically pure bodies. These bodies are, of course, not diluted with many times their own weight of inert diluents, such as water, or like inert aqueous solvents. These absorbents are also very different from aqueous liquids, dilute aqueous solutions etc., in that they are (being usually produced from coal tar or coal tar distillates) of a somewhat oily character, and can be described as oily absorbent materials containing simple phenolic bodies as active absorbing ingredients. When used in the impure or crude states, as above referred to, the usual impurities are mostly of an oily character (as distinguished from aqueous materials).

The separation between the absorbent and the products absorbed is done either by injecting steam, allowing the removal of almost the entire amount of camphor and naphthalene or by precipitation with soda, resulting in the formation of alkaline phenolic salts (alkali metal phenolates etc.) soluble in water, and by the same act, in the separation by precipitation of camphor and naphthalene.

As example of the industrial scope of this invention its application can be noted as follows:—

1. The treatment of gas coming from the distillation of coal. This application would result in permitting the simultaneous recovery, in only one scrubbing operation, of naphthalene and benzol; in other words, there would be discarded, in the case in hand, the usual preliminary operation of washing the coal gas in order to extract the naphthalene, since, by the same treatment, the naphthalene and benzol are absorbed from the coal gas.

2. The treatment of gaseous mixtures from celluloid plants. This application would allow of the simultaneous recovery of the vapors of camphor and solvents lost in process. In this last case suitable indirect heating will result in the total liberation of the solvents absorbed but in only the partial liberation of the camphor also absorbed at the same time as the solvents.

It is, then, an absorbent containing camphor which goes again into circulation and continues circulating until said absorbent is found to be loaded with about 10% of its weight of camphor. This percentage reached and verified by convenient tests—at the end of a certain number of circulations of the absorbent in the recovery apparatus, the camphor is separated from the absorbent by precipitation with soda, after the solvents have been driven off. The recovered camphor goes back into the process, while the sodium salt of the phenolic absorbent is utilized as disinfectant or regenerated by treatment with acid, or, better, an acid salt like sodium bisulphate.

Concerning camphor and naphthalene, it will be noted that each of these substances may be broadly defined as a substance solid at normal temperatures and at normal pressures (atmospheric), but which at said normal temperatures and pressures give off vapors to some extent, whereby in time it becomes dissipated.

In other words, each of these substances may be defined as a solid of a volatile nature; each may also be further defined as a volatile organic solid, since each is an organic substance. Both camphor and naphthalene also act, to some extent at least, as a solid solvent for pyroxylin.

It will also be noted that camphor is a solid at 20 degrees centigrade and at that temperature has a vapor tension of 0.015 centimeters of mercury. It remains in a solid state up to its melting point, which is approximately 176 degress centigrade. Similarly naphthalene is a solid at 20 degrees centigrade, and at this temperature has a vapor tension of 0.008 centimeters of mercury. It remains in a solid state up to its melting point which is approximately 80 degrees centigrade.

I am aware that an aqueous solution of picric acid has heretofore been proposed as an absorbent for naphthalene. I make no claim to the use of the picric acid solution, but what I use is phenols, which are hydroxy compounds of aromatic bodies, and these are compounds of carbon, hydrogen and oxygen. These phenols (but not picric acid) can be referred to as "simple phenols".

I claim as my invention:—

1. In an art employing, producing or obtaining camphor or naphthalene, the application of an absorbent liquid consisting essentially of phenolic bodies in a concentrated condition, such bodies consisting of carbon, hydrogen and oxygen, for the absorption of the vapors of camphor and naphthalene from gaseous mixtures which contain them, and the separation of the absorbed products from the absorbent.

2. A process of recovering a normally solid slightly volatile organic solid solvent, existing in vapor form, which comprises passing the gas containing such vapor into contact with a liquid absorbent which consists essentially of phenols in a relatively concentrated condition, consisting of compounds of hydrogen, carbon and oxygen, and thereafter separating the absorbed solvent from the absorbent.

3. A process of recovering a volatile organic solid from a gas containing the same in vapor form, which comprises passing the gas containing such vapor into contact with a liquid absorbent consisting essentially of cresols and thereafter separating the absorbed solid from the absorbent.

4. In the absorption and recovery of a volatile organic solid, the herein described improvement which comprises bringing the said volatile solid, in the form of vapor, into contact with an absorbent consisting essentially of phenols in a relatively concentrated condition, and consisting of carbon, hydrogen and oxygen.

5. In the absorption and recovery of a volatile organic solid, the herein described improvement which comprises bringing the same, in the form of vapor, into contact with an absorbent consisting essentially of cresylic acids.

6. The method of recovering vaporized camphor contained in gaseous mixtures, which consists in absorbing said camphor from said mixtures by means of phenols and subsequently separating the said camphor therefrom.

7. A process for the recovery of camphor from a gaseous mixture containing the same, consisting in bringing the gaseous mixture into intimate contact with an absorbing agent consisting essentially of crude phenolic bodies, heating the resulting mixture, and vaporizing the camphor from the last mentioned mixture.

8. The method of recovering a vaporized volatile organic solid from a gas containing the same which comprises absorbing the vaporized solid in crude cresol, thereafter recovering the absorbed vapors of the solid from the crude cresol, and reusing the crude cresol for absorbing a further amount of vaporized substances for the purpose of ultimately recovering the same.

9. The method of recovering a volatile organic solid when in vapor form and contained in a gaseous mixture, which consists in absorbing said substances from said mixture by absorbents consisting essentially of simple phenols and subsequently precipitating said substance thus absorbed from the absorbent by the use of soda.

10. The repeated employment of phenolic absorbent bodies for the absorption of vapors of a volatile organic solid from gaseous mixtures by a process involving alternately absorbing vapors by the phenolic absorbent bodies, and distilling off from the absorbent of a part of said absorbed volatile organic solid, and continuing said steps until the absorbent contains several per cent of said volatile organic solid, treating the absorbent by caustic alkali to form a phenolate and to precipitate the volatile organic solid, separating the volatile organic solid from the phenolate, regenerating the phenolic absorbent from the phenolate by treating with an acid material.

11. The repeated employment of phenolic absorbent bodies for the absorption of vapors of a volatile organic solid from gaseous mixtures by a process involving alternately absorbing vapors by the phenolic absorbent bodies, and distilling off from the absorbent of a part of said absorbed volatile organic solid, and continuing said steps until the absorbent contains several per cent of said volatile organic solid, treating the absorbent by caustic alkali to form a phenolate and to precipitate the volatile organic solid, separating the volatile organic solid from the phenolate, regenerating the phenolic absorbent from the phenolate by treatment with an acid salt.

12. A process which comprises bringing a gas mixture containing vapors of a solid organic body capable of acting as a solid solvent of pyroxylin, into intimate contact with an absorbing liquid of a somewhat oily character, such liquid containing a simple phenolic body as an active absorbing agent for such vapors.

Specification signed this 23rd day of Nov. A. D., 1920.

JEAN HENRY BRÉGEAT.